United States Patent [19]
Becher et al.

[11] 3,894,144
[45] July 8, 1975

[54] PROCESS FOR MAKING SULFATE-CONTAINING BASIC ALUMINUM CHLORIDE

[75] Inventors: Wilfried Becher, Anderten, Ub. Han.; Joachim Massonne, Hannover, both of Germany

[73] Assignee: Kali-Chemie Aktiengesellschaft, Hannover, Germany

[22] Filed: Feb. 17, 1972

[21] Appl. No.: 227,301

[30] Foreign Application Priority Data
Feb. 19, 1971 Germany.............................. 2107970
Dec. 22, 1971 Germany.............................. 2163711

[52] U.S. Cl................................. 423/467; 423/462
[51] Int. Cl............................................. C01b 17/46
[58] Field of Search............................ 423/467, 462

[56] References Cited
UNITED STATES PATENTS

| | | | |
|---|---|---|---|
| 1,430,449 | 9/1922 | Howard ................................ | 423/495 |
| 2,369,691 | 2/1945 | Schmerling et al. ................ | 423/467 |
| 2,493,262 | 1/1950 | Porvasnik ........................... | 423/467 |
| 3,544,476 | 12/1970 | Aiba et al. ......................... | 423/556 X |

FOREIGN PATENTS OR APPLICATIONS

| | | | |
|---|---|---|---|
| 1,334,336 | 7/1963 | France................................ | 423/467 |

Primary Examiner—Edward Stern
Attorney, Agent, or Firm—Michael S. Striker

[57] ABSTRACT

Sulfate-containing basic aluminum chlorides in the form of aqueous solutions or in solid form are made by reacting concentrated hydrochloric acid with aluminum hydroxide at elevated temperature; then reacting the thus formed aluminum chloride in a pressure vessel with further aluminum hydroxide and an amount of concentrated sulfuric acid to provide for a ratio of Cl to $SO_4$ ($y$:$z$/2) between 8:1 and 80:1; thereafter heating the mixture under autogenous pressure to between 130° and 200°C and finally separating out unreacted aluminum hydroxide and, if a solid is wanted, evaporating the water.

The aluminum chlorides thus obtained have the formula

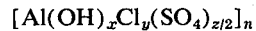

$$[Al(OH)_x Cl_y (SO_4)_{z/2}]_n$$

wherein $x + y + z = 3$, $y + z$ is a value between 1 and 2 and $z$ is a value between 0.02 and 0.3.

The basic aluminum chlorides are particularly useful for sewage treatment and can also be used for impregnating textiles and as components in cosmetic preparations.

10 Claims, No Drawings

PROCESS FOR MAKING SULFATE-CONTAINING BASIC ALUMINUM CHLORIDE

BACKGROUND OF THE INVENTION

The invention relates to a process for making sulfate containing basic aluminum chlorides.

A number of processes have become known for making basic aluminum chlorides and obtaining the products either as solid material or in the form of an aqueous solution. Most of the products obtained in the prior art processes have, however, only a low degree of action when used for phosphate removal from sewage.

Solid basic aluminum chlorides can for instance be obtained by heating aluminum chloride hexahydrate ($AlCl_3 \cdot 6\ H_2O$) at a temperature between 150° and 170°C until a weight loss of about 60 percent has occurred. By partial elimination of the water of crystallization and of the hydrogen chloride a basic aluminum chloride is thus obtained which can be dissolved in hot water (German Pat. No. 1 102 713).

Solid basic aluminum chloride also obtained by treating anhydrous aluminum chloride with water in a condition of high dispersion at a temperature up to the boiling point of the water (German published application No. 1 567 470). This last method has, however, the disadvantage that the starting materials are not readily and without limitation available.

Aqueous solutions of basic aluminum chlorides can be obtained in different ways according to the prior art. For instance in Union of Soviet Socialist Republics patents Nos. 119,870 and 126,189 these solutions are obtained by careful acidifying of freshly precipitated aluminum hydroxide suspensions with hydrochloric acid.

Another process proceeds from the well known fact that aluminum hydroxide can be dissolved to limited degrees in aluminum chloride solutions of a higher concentration. In German published application No. 1,592,072 this old process is intended to be improved by reacting the aqueous aluminum chloride solution with an aluminum hydroxide which has been obtained by precipitation of an aluminum chloride solution with a sodium carbonate solution and subsequently heating the suspension to boiling temperature. The solutions obtained in these processes are useful for instance for hydrophobizing textiles.

Basic aluminum chloride solutions suited for treatment of sewage waters are obtained according to the published Japanese application 6687/70 by precipitating the sulfate ions with calcium carbonate as insoluble calcium sulfate from an aqueous solution which has been obtained by mixing aluminum chloride solution and aluminum sulfate solution. The basic aluminum chlorides which are present in the solution essentially have the general formula $Al_h(OH)_mCl_{3n-m}$.

The solutions obtained may still include minor $SO_4$ contents. A shortcoming of this process is that only dilute solutions can be obtained of which the $Al_2O_3$ contents is about 10 percent. A further shortcoming is that necessarily large amounts of impure gypsum are obtained in this process.

It is therefore an object of the present invention to obtain aluminum salt solutions of basic character and of comparatively high concentrations which are useful among others also for sewage treatment.

Another object is to obtain these products by modifying any desired and available aluminum hydroxide which has a sufficient solubility in acids without the necessity to use only freshly made aluminum hydroxide.

SUMMARY OF THE INVENTION

The invention resides in an exothermic process for making the sulfate containing basic aluminum chlorides of the formula $$[Al(OH)_xCl_y(SO_4)_{z/2}]_n$$

wherein $x + y + z = 3$, $y + z$ equals a value between 1 and 2 and $z$ is a value between 0.02 and 0.3.

According to the process of the invention concentrated hydrochloric acid is first reacted with aluminum hydroxide at an elevated temperature, the thus formed aluminum chloride solution is then reacted in a pressure vessel with further aluminum hydroxide and an amount of concentrated sulfuric acid to provide for a ratio between Cl and $SO_4$ which is between 8 : 1 and 80 : 1, whereupon the mixture is heated under autogenous pressure to 130° to 200°C and the unreacted aluminum hydroxide is finally separated out from the solution. If a solid is wanted the water is then evaporated from the solution.

DETAILED DESCRIPTION OF THE INVENTION AND OF PREFERRED EMBODIMENTS

The subscript $n$ used in the above formula has the purpose only to indicate that the products are of a polymeric nature. The specific value of $n$ is without significance for the invention. A particular advantage of the process of the invention is that all kinds of aluminum hydroxide modifications can be used provided only that they have a sufficient acid solubility. It is not necessary to rely only on freshly made aluminum hydroxide. Particularly suitable as starting product is hydrargillite (gibbsite).

The process of the invention can be practiced in a discontinuous or continuous operation. An aqueous solution of aluminum chloride is for instance mixed in a suitable pressure vessel with at least such amount of aluminum hydroxide as corresponds to the desired composition of the basic aluminum salt. In order to obtain high concentration solutions of the basic aluminum salts one starts from a highly concentrated aqueous aluminum chloride solution. In order to make the aluminum chloride solution aluminum hydroxide is reacted with a high precentage hydrochloric acid.

For the industrial practice the reaction in which the saturated aluminum chloride solution is obtained can also be carried out in a closed pressure vessel while permitting the pressure to rise. This will accelerate the reaction. To this mixture there is then added an amount of sulfuric acid for instance in the form of a 50 percent concentration aqueous sulfuric acid solution so as to obtain a ratio between Cl and $+SO_4$ in the above indicated range.

The reaction is carried out by heating the mixture to a temperature between 130° and 200°C and adjusting the pressure to slightly below the water vapor pressure applying to the selected temperature.

The reaction can be accelerated by providing an intimate mixture of the mass during the reaction. Since the time of the reaction depends substantially on the amount of added sulfuric acid and on the specific temperature it is advisable to use relatively high sulfuric acid concentrations and a corresponding high temperature particularly where less active aluminum hydroxides are employed.

It is preferred to adjust the mixture to a ratio between Cl and $SO_4$ ($y : z/2$) which is between 8 : 1 and 40 : 1. Apart from the fact that in case of too low an $SO_4$ content in the mixture of the speed of reaction of the basic aluminum salts will be reduced considerably and difficulties may also be encountered when separating the undissolved aluminum hydroxide. If the $SO_4$ content of the mixture is sufficiently high the liquid final product will have a tendency for precipitation of solid products.

It has also been found that products which are made by adjusting the $SO_4$ content within the indicated preferred ratio of Cl to $SO_4$ exhibit excellent precipitation properties for dissolved phosphate during the sewage treatment.

The preferred reaction temperatures are between 140° and 180°C. Less active aluminum hydroxides can be used and excessive reaction time can be avoided by adding the aluminum hydroxide in an excess and discontinuing the reaction once the desired amount of aluminum hydroxide has been dissolved. The unreacted aluminum hydroxide is then separated from the solution and recirculated into the process for making a new aluminum chloride solution.

Depending on the acid solubility of the aluminum hydroxide, the added amount of sulfuric acid and the reaction temperature the time of the reaction may be between a few minutes and several hours.

The process of the invention is distinguished from prior art processes for making aqueous solutions of basic aluminum salts, among others, by the fact that it is carried out at a temperature which is above the boiling point of the mixture. This is possible because the reaction is effected in a pressure vessel under the autogenous pressure of the mixture which adjusts itself during the reaction. This feature permits the dissolving of sufficient amounts of aluminum hydroxide in comparatively short time. This is of particular significance for the activity of the product for the purpose of phosphate precipitation. Extended reaction times which are necessary in case of low temperatures lead, because of a not yet fully explored structural change, to a product which is characterized by exorbitant deterioration of the precipitation properties in respect of phosphates.

According to a special embodiment of the invention the concentrated hydrochloric acid is reacted with the aluminum hydroxide and sulfuric acid in one and the same pressure vessel. The hydrochloric acid and sulfuric acid in this case are employed in amounts to maintain the ratio of Cl to $SO_4$ ($y : z/2$) within the range between 8 : 1 and 80 : 1. The aluminum hydroxide is added at least in that amount which is necessary to form the desired final product with the mixture of acids.

As appears the sulfate-containing basic aluminum chlorides here are obtained directly from the three starting products, that is from the aluminum hydroxide, the hydrochloric acid and the sulfuric acid. This one-stage process has the advantage that the reaction heat generated in the exothermic formation of aluminum chloride solution from aluminum hydroxide and hydrochloric acid can be used to heat up the mixture to the temperature which is necessary to form the basic salts. This is particularly important if the application of heat is effected by introduction of steam into the mixture. An excessive dilution of the formed sulfate-containing basic aluminum chloride solution can thus be prevented during the condensation of steam.

Too much dilution of the products can also be avoided by using the acids in a highly concentrated form. If the proper conditions are observed, products can be obtained having an $Al_2O_3$ contents up to about 20 percent by weight.

For the industrial application of the process of the application solid aluminum hydroxide is preferably employed in an excess over the amount necessary according to the formula of the final product. The reason is that in this case less active aluminum hydroxides may be used as starting products. In general the aluminum hydroxide should be employed in an amount to provide for a ratio of $Al_2O_3$ : Cl between 1 : 2 and 1 : 2.5. A sulfate-containing basic aluminum chloride solution can then be obtained at an industrially acceptable speed.

By an intimate mixing during the reaction it is also possible to considerably increase the reaction speed. The total reaction time may then be substantially shorter than it is in the case of the two-stage process.

The economies of the process are not impaired by using an excess of aluminum hydroxide since the residue obtained can be separated from the solution of the sulfate- containing basic aluminum chloride and can then be reused together with fresh aluminum hydroxide.

The repeated performance in a number of cycles has no undesirable effect on the speed of formation of the sulfate-containing basic aluminum chlorides and on the quality of the products obtained provided the aluminum hydroxide employed is of sufficient purity.

The basic aluminum chlorides obtained in the invention can be used for impregnating textiles and the antiperspirant components of cosmetic preparations provided they are obtained at a sufficient degree of purity particularly regarding the iron contents. Above all, the sulfate-containing basic aluminum chlorides obtained in the process of the invention are useful for sewage treatment purposes. As appears from the following examples aqueous solutions of sulfate-containing basic aluminum chlorides having a concentration of $Al_2O_3$ in the range of about 20 percent by weight can be obtained by employing hydrargillite as starting product. The product can be commercially used in this form. However, the viscous solutions can also be converted to solid products by removing the water under mild conditions for instance by spray evaporation under reduced pressure. There is then obtained a hygroscopic solid material which can easily be dissolved in cold water.

One of the principal advantages of the process of the invention is the possibility to use readily available chemicals as starting products. There is furthermore an absence of side products or waste. Thus air or water pollution is avoided. A further advantage is that solutions of high concentrations can directly be obtained wherever solutions constitute a product which can more easily be handled for industrial purposes. The products also have excellent coagulating and flocculating action on turbidities in sewage waters and an excellent precipitation property for dissolved pollutants, particularly phosphates.

EXAMPLE 1

78 g of hydrargillite and 365 g of a 30 percent aqueous hydrochloric acid solution were placed in a three neck flask which was provided with a stirrer and reflux condenser. The mixture was heated to boiling point while stirring. The suspended hydrargillite dissolved, at first, in a violent and soon thereafter in a quieter reaction except for a small residue. The reaction was stopped after an hour and a small specimen was taken from the aluminum chloride solution for analysis purposes. The analysis showed a content of 11.0 percent $Al_2O_3$ and 23.5 percent Cl.

The aluminum chloride solution was then placed in a strong walled glass vessel and 156 g of hydrargillite and 45 g of a 50 percent concentration sulfuric acid were added. The vessel was then closed in a pressure tight manner and mechanically shaken in an electric heating device. The reaction temperature was set for 170°C and was maintained for 1 hour. After cooling to about 50°C the vessel was opened and the undissolved hydrargillite (57.5 g) was removed from the solution by filtration. The analysis of a specimen of the liquid product showed 19.0 percent $Al_2O_3$, 17.0 percent Cl and 3.6 percent $SO_4$. These percentages correspond to a composition of the formed basic salt in accordance with the following formula $[Al(OH)_{1.51}Cl_{1.29}(SO_4)_{0.10}]_n$.

To test the activity of this product as an agent for sewage treatment 100 ml of a dilute specimen having a content of 100 mg $Al_2O_3$ were added to 1 liter river water which contained sodium trimetaphosphate and orthophosphate in a ratio of about 5 : 1 with a total content of 6.15 mg $P_2O_5/l$. After short stirring and a settling time of 10 minutes 500 ml clear water were withdrawn from the specimen. The analysis showed a phosphate removal in an amount of 91.8 percent.

EXAMPLE 2 (COMPARATIVE)

This example and the following examples are for comparison purposes. The mass described in Example 1 consisting of aqueous aluminum chloride solution and hydrargillite was heated without the addition of sulfuric acid for 4 hours at 170°C in a closed pressure vessel. The mixture obtained had poor filtration properties which had an undesirable effect on the yield of basic aluminum salt solution. The analysis of the solution showed a content of 12.2 percent $Al_2O_3$ and 16.9 percent Cl. This proved that only a small amount of hydrargillite had been dissolved.

The specimen was then tested as in Example 1 regarding the phosphate removal. The phosphate removal was only to an amount of 9.2 percent.

EXAMPLE 3 (COMPARATIVE)

The mass consisting of aqueous aluminum chloride solution and hydrargillite described in Example 1 was mixed with 30 g of a 50 percent sulfuric acid and then heated at atmospheric pressure under reflux to the boiling point. The reaction was discontinued after 21 hours and the unreacted hydrargillite (70 g) separated. The liquid product had a content of 16.7 percent $Al_2O_3$, 18.8 percent Cl and 2.5 percent $SO_4$.

In a phosphate removal test as in Example 1 a removal in an amount of 12.0 percent was determined.

EXAMPLE 4

The mass consisting of aqueous aluminum chloride solution and hydrargillite as described in Example 1 was reacted with 60 g of a 50 percent aqueous sulfuric acid solution and heated in a closed pressure vessel to 140°C for 5 hours. After discontinuing the reaction the amount of hydrargillite removed by filtration was 66.7 g. The analysis showed a composition of the liquid product of 17.9 percent $Al_2O_3$, 17.2 percent Cl and 4.5 percent $SO_4$.

These percentage figures indicate a composition of the basic salt corresponding to the formula $[Al(OH)_{1.35}Cl_{1.38}(SO_4)_{0.13}]$.

A test regarding the phosphate precipitation properties as made in Example 1 showed a phosphate removal in an amount of 85.1 percent.

EXAMPLE 5

56.1 kg of a 39 percent hydrochloric acid were placed in an enameled heavy stirring vessel which was provided with an immersion tube for introduction of steam and which had a good insulation against heat.

The hydrochloric acid was then reacted while stirring with 37.3 kg of a hydrate of alumina which had a content of $Al_2O_3$ of 23.9 kg. In addition 26.6 kg of hydrate of alumina residue obtained from a previous run of the process were added. This residue had an $Al_2O_3$ content of 8.1 kg and in addition contained 2.9 kg chlorine and 1.7 kg sulfate. 4.6 kg of a 63 percent sulfuric acid were added subsequently.

The vessel was then closed pressure-tight and steam was introduced so as to bring the temperature up to the desired level. After a stirring time of about 15 minutes the mixture in the vessel showed a temperature rise from 60° to 115°C within a few minutes. Subsequently the temperature rise proceeded more slowly to 170°C. The mixture was then subjected to stirring at this temperature for another 90 minutes.

The introduction of steam was then interrupted and a valve was opened to cause pressure release and cooling of the reaction mixture. After settling of the major portion of the undissolved solid residue the supernatent solution was removed pneumatically through the immersion tube from the vessel and pressed upon a suction filter where the remaining solid particles were separated under reduced pressure. There was thus obtained a filtrate in the amount of 111.5 kg which contained 20.5 kg $Al_2O_3$, 20.6 kg of chlorine and 1.9 kg of sulfate. The sulfate-containing basic aluminum chloride solution accordingly had an $Al_2O_3$ content of 18.4 percent. This corresponded to a composition as follows:

$[Al(OH)_{1.47}Cl_{1.45}(SO_4)_{0.04}]_n$.

The total residue had a weight of 32.6 kg and a solid contents of 13.5 kg. The residue contained 11.2 kg of $Al_2O_3$, 3.6 kg of chlorine, and 2.3 kg of sulfate. This residue was then added to the next run for further use.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. A process for the production of a composition of matter consisting essentially of an aqueous solution containing a substance having a chemical composition conforming to that of a sulfate-containing basic aluminum chloride having the general formula $[Al(OH)_x Cl_y(SO_4)_{z/2}]_n$ in which z is a value between 0.02 and 0.3, the sum of y and z is a value between 1 and 2, and the sum of x, y and z is 3, and n is an integer of at least 1, which comprises heating together in a closed vessel at a temperature between 130° and 200°C under its own autogenous pressure a mixture of aluminum hydroxide, concentrated hydrochloric acid and concentrated sulfuric acid, the hydrochloric and sulfuric acids being present in a molecular ratio of Cl to $SO_4$ between 8 : 1 and 80 : 1 and the aluminum hydroxide being present in an amount that is at least equivalent stoichiometrically to that required to form a composition having the foregoing formula, and subsequently separating any unreacted aluminum hydroxide from the resulting solution.

2. A process as defined in claim 1 in which the aluminum hydroxide is gibbsite.

3. The process of claim 1 wherein the residue formed in the reaction is recovered for reuse together with fresh aluminum hydroxide in the process of the invention.

4. The process of claim 1 wherein the aluminum hydroxide is used in an excess over the required amount.

5. The process of claim 1 wherein the said reaction temperature is obtained by introducing steam into the mass during the reaction.

6. A process as defined in claim 1 which comprises heating together a mixture of aluminum hydroxide with concentrated hydrochloric acid to produce a solution of aluminum chloride, adding to the said aluminum chloride solution an amount of concentrated sulfuric acid sufficient to provide a molecular ratio of Cl to $SO_4$ in the solution between 8:1 and 80:1 together with an additional amount of aluminum hydroxide, thereafter heating the mixture in a closed vessel under its own autogenous pressure to a temperature between 130 and 200°C and separating the insoluble unreacted aluminum hydroxide from the resulting solution.

7. The process of claim 6 wherein the heat arising from the exothermic reaction between aluminum hydroxide and hydrochloric acid is used to obtain the said elevated reaction temperature.

8. A process as defined in claim 1 in which the molecular ratio of Cl to $SO_4$ is between 8:1 and 40:1.

9. A process as defined in claim 1 in which the resulting solution is evaporated to obtain a solid substance having a composition conforming to that of a sulfate-containing basic aluminum chloride having the formula specified in claim 11.

10. A process as defined in claim 1 in which the aluminum hydroxide is employed in an amount to provide for a ratio of $Al_2O_3$:Cl between 1:2 and 1:2.5.

* * * * *